[United States Patent Office — 3,764,473 — Patented Oct. 9, 1973]

3,764,473
PROCESS FOR PRODUCING L-GLUTAMIC ACID

Katsunobu Tanaka, Kazuo Kimura, Takeo Suzuki, and Ken Yamaguchi, Machida-shi, Japan, assignors to Kyowa Hakko Kogyo Co., Ltd., Tokyo, Japan
No Drawing. Continuation of application Ser. No. 643,832, June 6, 1967. This application July 31, 1968, Ser. No. 748,983
Claims priority, application Japan, June 17, 1966, 41/38,852
Int. Cl. C12d 13/06
U.S. Cl. 195—28 R                         10 Claims

ABSTRACT OF THE DISCLOSURE

Process for producing L-glutamic acid which comprises culturing a microorganism capable of producing L-glutamic acid under aerobic conditions in an aqueous nutrient medium containing at least one hydrocarbon as the main carbon source and an antibiotic and a dispersing agent for said hydrocarbon. Exemplary antibiotics include penicillin, bacitracin, cycloserine, kanamycin, streptomycin, spiramycin, Cefalotin, Cephaloridine and novobiocin. Exemplary dispersing agents include anionic, cationic and nonionic substances and higher fatty acids and organic esters. The combination of an antibiotic and a dispersing agent in the medium gives a synergistic effect, resulting in a remarkable acceleration in the production of L-glutamic acid.

CROSS-REFERENCE TO RELATED APPLICATION

This application is a continuation of copending application Ser. No. 643,832, filed on June 6, 1967, now abandoned.

The present invention relates to a process for producing L-glutamic acid. More particularly, it relates to a process for the production of L-glutamic acid by fermentation. Even more particularly, the invention relates to a process for the production of L-glutamic acid by fermentation with microorganisms in an aqueous nutrient medium containing hydrocarbons.

Heretofore, various fermentation methods with the use of hydrocarbons as the carbon source in the nutrient medium have been employed. However, because such a carbon source is not water-soluble, the transfer of substances into the fermentation is carried out among three phases, i.e., the microorganism, the aqueous solution and the hydrocarbon. This problem results in a more inefficient process than with the case of water-soluble carbohydrates as the carbon source.

One of the objects of the present invention is to provide an improved process for the preparation of L-glutamic acid which overcomes the disadvantages and deficiencies of the prior art methods.

Another object of the present invention is to provide a process for producing L-glutamic acid by fermentation in the presence of hydrocarbons as the carbon source which may be carried out in an efficacious and simple manner.

A further object of the invention is to provide a process for preparing L-glutamic acid by fermentation which may be carried out advantageously on an industrial scale to give a high yield of product.

A still further object of the invention is to accelerate fermentation with hydrocarbons so as to produce L-glutamic acid in high yield and high efficiency.

These and other objects and advantages of the present invention will become apparent to those skilled in the art from a consideration of the following specification and claims.

In accordance with the present invention, it has been found that the addition of antibiotics and of dispersing agents for hydrocarbons to a culture medium containing hydrocarbons as the carbon source gives a greatly improved fermentation process for the production of L-glutamic acid with microorganisms capable of producing the same. This appears to result from an acceleration in the hydrocarbon fermentation by utilizing the synergism of the growth control and the improved power of cell membrane-permeability possessed by antibiotics and the dispersing power on hydrocarbons possessed by certain dispersing agents.

The present invention is predicated on the joint use of antibiotics and dispersing agents together in the culture medium in which the fermentation is conducted. It is known that antibiotics have not only a controlling power on microorganisms but also the capability of improving cell membrane-permeability. However, it is not possible to accelerate efficiently hydrocarbon fermentation when using antibiotics singly. This is believed to be chiefly based on the insufficient dispersion of hydrocarbons. The present inventors have found that the addition of various surface active agents, higher fatty acids or the esters thereof is effective for the dispersion of hydrocarbons into an aqueous solution, thereby obviating the problem mentioned above.

It is interesting to note that the use of antibiotics and dispersing agents in the medium together gives a synergistic action with a resultant remarkable accelerating effect on the fermentation. Such an acceleration does not occur when either antibiotics or dispersing agents are used separately.

Antibiotics which may be used in accordance with the present invention include substances such as penicillin, bacitracin, cycloserine (4-amino-isoxazolidone), etc. As dispersing agents, there may be mentioned, by way of example, various surface active agents such as those having the trade names of Nimean S–204 (polyoxyethylene alkylamine), Nonion E–215 (polyoxyethylene oleyl ether), Nonion LP–20R (sorbitan monolaurate), Cation SA 2502 (octadecyl amine acetate), Nimid F 215 (polyoxyethylene alkylamide), Nonion ST 221 (polyoxyethylene sorbitan monostearate), Nonion L–4 (polyethylene glycol monolaurate), Nonion 0–6 (polyethylene glycol monooleate) (all manufactured by Nippon Oil & Fats Co. Ltd., Japan), etc., various higher fatty acids such as oleic acid, palmitic acid, stearic acid, lauric acid, etc. or the salts thereof, for example, the alkali metal salts, and higher fatty acid esters such as sorbitan monooleate, the oleic acid ester of polyoxyethylene glycol, the palmitic acid esters of polyoxyethylene glycol, etc. Moreover, various combinations or mixtures of these compounds may also be effectively used.

As for the fermentation per se, either a synthetic culture medium or a natural nutrient medium is suitable as long as it contains the essential nutrients for the growth of the microorganism strain employed. Such nutrients are well known in the art and include substances such as a carbon source, a nitrogen source, inorganic compounds and the like which are utilized by the microorganism employed in appropriate amounts. The fermentation in connection with the present invention is conducted in an aqueous nutrient medium containing a hydrocarbon or a mixture of hydrocarbons as the main carbon source. Such hydrocarbons include straight and branched-chain paraffins (alkanes) having from 5 to 24 carbon atoms, such as n-pentane, n-octane, n-decane, n-dodecane, n-hexadecane, isopentane, isooctane, etc., cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, etc., and mixtures thereof and mixed hydrocarbons such as kerosene, light oils, heavy oils, paraffin oils, etc. Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the fermentation medium along with the hydrocarbon. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc., may be employed. These substances may also be used either singly or in combinations of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. Moreover, it may also be necessary to add certain essential nutrients to the culture medium, depending upon the particular microorganism employed, such as amino acids, for example, aspartic acid, threonine, methionine, etc., and/or vitamins, for example, biotin, thiamine, cobalamin and the like.

Fermentation is conducted under aerobic conditions, such as aerobic shaking of the culture or with stirring of a submerged culture, at a temperature of about 20° to 50° C. and a pH of about 5.0 to 9.0. After about 2 to 5 days of culturing under these conditions, remarkably large amounts of L-glutamic acid are found to be accumulated in the fermentation liquor.

After the completion of fermentation, the L-glutamic acid may be separated from the culture liquor by conventional means, such as ion exchange resin treatment, precipitation with metallic salts, chromatography or the like.

The following examples are given merely as illustrative of the present invention and are not to be considered as limiting. Unless otherwise noted, the percentages therein are by weight.

EXAMPLE 1

Three liters of the following culture medium is prepared in a 5 liter jar fermentor:

| | Percent |
|---|---|
| $K_2HPO_4$ | 0.2 |
| $MgSO_4 \cdot 7H_2O$ | 0.01 |
| $MnSO_4 \cdot 4H_2O$ | 0.002 |
| $FeSO_4 \cdot 7H_2O$ | 0.02 |
| $NH_4NO_3$ | 2.0 |
| $CaCO_3$ | 3.0 |
| Cornsteep liquor | 0.3 |

The pH of this medium is 7.0.

Arthrobacter paraffineus No. 2411 ATCC 15591, previously cultured with aerobic shaking in a bouillon medium for twenty-four hours, is inoculated in the ratio of 10% into the above culture medium. Culturing is carried out with agitation at 600 r.p.m. and with aeration at the rate of one liter per liter per minute at 28° C. An n-paraffin mixture containing from 12 to 14 carbon atoms is added to the medium in an amount of 2% (v./v.) at the beginning of cultivation and intermittently added every 12 hours in the same amount.

After twelve hours of culturing, 0.005% of the surface active agent, Nonion LP–20R (sorbitan monolaurate: manufactured by Nippon Oil & Fat Co. Ltd., Japan) is added to the medium every 12 hours. In addition, after twenty hours of culturing, 300,000 units of penicillin G is added to the medium. The pH is adjusted to between 5.0 and 9.0 by the addition of ammonia water during cultivation.

After 72 hours of culturing, the amount of L-glutamic acid found to be produced in the culture liquor is 65 mg./ml. About 160 grams of crystals of L-glutamic acid is obtained by adsorption with the use of the ion exchange resin, Amberlite IR120 (H+), elution with ammonia water, removal of the ammonia under reduced pressure and, then, adjustment of the pH to 3.2 with hydrochloric acid.

When the same experiment is carried out without using the surface active agent or without the penicillin, or without both of them, the amounts of glutamic acid produced are 35 mg./ml., 20 mg./ml. and 1.0 mg./ml., respectively.

EXAMPLE 2

A culture medium is prepared by adding 5 ml. of kerosene and 5 mg. of Tween 20 to 50 ml. of a culture medium contained in a 500 ml. Sakaguchi flask containing the following components:

| | Percent |
|---|---|
| $KH_2PO_4$ | 0.1 |
| $Na_2HPO_4 \cdot 12H_2O$ | 0.1 |
| $MgSO_4 \cdot 7H_2O$ | 0.001 |
| $MnSO_4 \cdot 4H_2O$ | 0.002 |
| $FeSO_4 \cdot 7H_2O$ | 0.02 |
| $NH_4NO_3$ | 2.0 |
| $CaCO_3$ | 3.0 |
| Cornsteep liquor | 0.3 |

The culture medium, having a pH of 7.0, is then sterilized.

Brevibacterium ketoglutamicum No. 2473 ATCC 15588, which has previously been cultured with aerobic shaking in a bouillon medium for 24 hours, is inoculated into the culture medium in a ratio of 10%. Culturing is then carried out with aerobic shaking with reciprocation of 130 times per minute.

After 24 hours of culturing, 5,000 units of penicillin G is added to the medium. After 72 hours of culturing, 36 mg./ml. of L-glutamic acid is found to be accumulated in the culture liquor.

When culturing is carried out under the same conditions, but without the addition of Tween 20 or penicillin to the medium, the amounts of L-glutamic acid produced are 20 mg./ml. and 15 mg./ml., respectively.

EXAMPLE 3

Corynebacterium hydrocarboclastus No. 2438 ATCC 15592 is inoculated into the same culture medium as described in Example 1. Culturing is carried out with aeration and agitation at 28° C. The agitation is carried out at 800 r.p.m., and the aeration at a rate of 1 liter per liter per minute.

A $C_{11}$–$C_{18}$ mixture of n-paraffins in the amount of 10% (w./w.) and Tween 80 (1 mg./ml.), sterilized before the beginning of culturing, are added to give a concentration of 1 mg./ml. in the culture medium. After eight hours of culturing, 300,000 units of procaine penicillin in oil is further added to the medium. After 72 hours of culturing, the amount of L-glutamic acid produced in the medium is 75 mg./ml.

When the same experiment is carried out in the same medium and under the same conditions, but without the addition of Tween 80, penicillin or both of them, the amount of glutamic acid accumulated is 50 mg./ml., 30 mg./ml. and 15 mg./ml., respectively.

EXAMPLE 4

Culturing is conducted in the same medium and under the same conditions as described in Example 3, but with the use of 0.1% of stearic acid as a dispersing agent and 100γ/ml. of bacitracin as the antibiotic additive. The amount of L-glutamic acid produced is 56 mg./ml.

When culturing is carried out under the same conditions but without adding stearic acid, bacitracin or a mixture thereof to the medium, the amounts of glutamic acid accumulated are 36 mg./ml., 16 mg./ml. and 10 mg./ml., respectively.

EXAMPLE 5

A fermentation medium having the following composition is prepared:

| | | |
|---|---|---|
| $KH_2PO_4$ | percent | 0.1 |
| $Na_2HPO_4 \cdot 12H_2O$ | do | 0.1 |
| $MgSO_4 \cdot 7H_2O$ | do | 0.05 |
| $FeSO_4 \cdot 7H_2O$ | do | 0.01 |
| $MnSO_4 \cdot 4H_2O$ | do | 0.002 |
| Cornsteep liquor | do | 0.3 |
| $NH_4NO_3$ | do | 2.0 |
| n-Undecane | do | 10 |
| Phenol red | mg./l | 10 |

The pH of the medium is 7.0

Twenty ml. portions of the culture medium are placed into 250 ml. flasks. The microorganism strain *Corynebacterium hydrocarboclastus* No. 2438 ATCC 15592 is then inoculated into the various flasks. Culturing is then carried out with aerobic shaking at 30° C. for 72 hours. The pH of the medium is adjusted to 6.0–7.0 with $(NH_4)_2CO_3$ during culturing. The amounts of L-glutamic acid accumulated in the fermentation liquor in the case of adding various fatty acids or these fatty acids plus antibiotics to the culture medium are shown in Table 1.

TABLE 1

| Fatty acids added | Concentration of addition, γ/ml. | Time of addition, hours | Amount of L-glutamic acid produced (mg./ml.) A | B |
|---|---|---|---|---|
| Lauric acid | 500 | 16 | 16.1 | 6.5 |
| Myristic acid | 500 | 16 | 15.2 | 5.6 |
| Palmitic acid | 500 | 16 | 15.3 | 6.6 |
| Stearic acid | 500 | 16 | 15.8 | 5.3 |
| Linolenic acid | 500 | 16 | 14.6 | 5.5 |
| Linoleic acid | 500 | 16 | 14.5 | 6.2 |
| Abietic acid | 500 | 16 | 14.9 | 8.9 |
| No addition | | | 10.5 | 2.1 |

Note.—A=50 units/ml. of penicillin G is added after 24 hours of culturing; B=No addition of penicillin.

EXAMPLE 6

Culturing is carried out with the same strain, the same nutrient medium and under the same conditions as described in Example 5. The amounts of L-glutamic acid accumulated in the case of adding various surface active agents or a combination of these surface active agents and antibiotics to the culture medium are shown in Table 2.

TABLE 2

| Surface active agents added | Concentration of addition, mg./ml. | Time of addition, hours | Amount of L-glutamic acid produced (mg./ml.) A | B |
|---|---|---|---|---|
| Nonion HS-215 (Polyoxyethylene alkyl aryl ether) | 1 | 0–16 | 15.2 | 7.0 |
| Nonion LP-20R (Sorbitan monolaurate) | 1 | 0–16 | 14.1 | 6.9 |
| Nonion OT-221 (Polyoxyethylene sorbitan monooleate) | 1 | 0–16 | 13.9 | 7.0 |
| Nonion PT-221 (Polyoxyethylene sorbitan monopalmitate) | 1 | 0–16 | 13.2 | 7.2 |
| Nonion ST-221 (Polyoxyethylene sorbitan monostearate) | 1 | 0–16 | 14.4 | 7.3 |
| Cation F2-50 (alkyl dimethyl benzyl ammonium chloride) | 1 | 0–16 | 13.5 | 6.8 |
| Cation PB-40 (Trimethyl hexadecyl ammonium chloride) | 1 | 0–16 | 14.6 | 7.0 |
| Softer No. 601 (Alkyl betaines) | 1 | 0–16 | 14.8 | 8.7 |
| Anon BF (Alkyl betaines) | 1 | 0–16 | 13.9 | 7.2 |
| Pronon 102 (High molecular weight surface active agent) | 1 | 0–16 | 14.4 | 7.3 |
| No addition | | | 8.9 | 2.1 |

Note.—A=50 units/ml. of penicillin G is added after 24 hours of culturing; B=No addition of penicillin.

EXAMPLE 7

A fermentation medium having the following composition is prepared:

| | | |
|---|---|---|
| $KH_2PO_4$ | percent | 0.1 |
| $Na_2HPO_4 \cdot 12H_2O$ | do | 0.1 |
| $MgSO_4 \cdot 7H_2O$ | do | 0.05 |
| $FeSO_4 \cdot 7H_2O$ | do | 0.01 |
| $MnSO_4 \cdot 4H_2O$ | do | 0.002 |
| Cornsteep liquor | do | 0.3 |
| $NH_4NO_3$ | do | 20 |
| n-Undecane | do | 10 |
| Phenol red | mg./l | 10 |

The pH of this medium is 7.0

Twenty ml. portions of the above culture medium are put into 250 ml. flasks. The microorganism *Corynebacterium hydrocarboclastus* No. 2438 ATCC 15592 is then inoculated in an amount of 10% by volume into the various flasks. Culturing is then carried out with aerobic shaking at 30° C. for 72 hours. During culturing, the pH of the medium is adjusted to 6.0–7.0 with $(NH_4)_2CO_3$. The amounts of L-glutamic acid produced in the case of adding various antibiotics as well as these antibiotics plus the surface active agent Tween 80 are shown in Table 3.

TABLE 3

| Antibiotics added | Concentration of addition, γ/ml. | Time of addition, hours | Amount of L-glutamic acid produced (mg./ml.) A | B |
|---|---|---|---|---|
| Kanamycin | 50 | 30 | 12.9 | 10.1 |
| Streptomycin | 100 | 24 | 10.8 | 8.2 |
| Streptomycin complex | 50 | 24 | 13.0 | 9.5 |
| Cycloserine | 100 | 24 | 12.8 | 10.2 |
| Spiramycin | 50 | 24 | 12.5 | 11.0 |
| (Kephrine) Cefalotin | 100 | 24 | 18.1 | 15.2 |
| (Seboran) Cephaloridin | 100 | 24 | 15.2 | 13.0 |
| Bacitracin | 100 | 24 | 12.1 | 10.2 |
| Nivobiocin | 100 | 24 | 11.8 | 9.6 |
| Penicillin G | ¹ 50 | 24 | 14.4 | 12.8 |
| No addition | | | 3.0 | 2.5 |

¹ Units/ml.

Note.—A: 100 γ/ml. of Tween 80 is added at the beginning of culturing
B: No addition of Tween 80.

The dispersing agent to be added to the nutrient medium in accordance with the present invention may be either anionic, cationic or nonionic. The only prerequisite is that it be capable of dispersing the hydrocarbon present in the medium. Examples of such dispersing agents have been shown above. They are well known in the art and, generically, comprise substances such as the sodium salts of high molecular weight alkyl sulfates or sulfonates, polyoxyethylene glycol derivatives, higher fatty acids having from 12 to 20 carbon atoms, for example, lauric acid, myristic acid, palmitic acid, stearic acid, oleic acid and the like, organic esters of higher fatty acids, such as sorbitan monooleate, etc. Exemplary antibiotics which may be used in the process of the present invention have also been shown above. The amount of antibiotic and dispersing agent to be added to the medium may be varied as desired, in accordance with the particular conditions employed, but preferably an amount of from 10γ/ml. to 100γ/ml. of each antibiotic and 100γ/ml. to 2 mg./ml. of each dispersing agent are advantageously employed.

It is also to be understood that any microorganism capable of producing L-glutamic acid by fermentation may be employed in the present invention and that this invention is not to be limited to the microorganisms specifically shown above for illustrative purposes only.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing L-glutamic acid which comprises culturing a microorganism capable of producing L-glutamic acid and belonging to the species selected from the group consisting of *Arthrobacter paraffineus, Brevibacterium ketoglutamicum* and *Corynebacterium hydrocarboclastus* under aerobic conditions in an aqueous nutrient medium containing at least one hydrocarbon as the main carbon source and an antibiotic selected from the group consisting of penicillin and bacitracin and a dispersing agent for said hydrocarbon selected from the group consisting of sorbitan monolaurate, polyoxyethylene sorbitan monolaurate, polyoxyethylene alkyl aryl ether, polyoxyethylene sorbitan monopalmitate, polyoxyethylene sorbitan monostearate, alkyl dimethyl benzyl ammonium chloride, trimethyl hexadecyl ammonium chloride, alkyl betaines, higher fatty acid having from 12 to 20 carbon atoms and organic esters of said higher fatty acid, and accumulating L-glutamic acid in the resultant culture liquor and recovering the L-glutamic acid therefrom.

2. The process of claim 1, wherein said microorganism is cultured at a temperature of about 20 to 50° C. and a pH of about 5.0 to 9.0 in said aqueous nutrient medium.

3. The process of claim 2, wherein said antibiotic is bacitracin.

4. The process of claim 1 wherein said antibiotic is a penicillin.

5. The process of claim 1, wherein said dispersing agent is selected from the group consisting of lauric acid, myristic acid, palmitic acid, stearic acid, oleic acid, linolenic acid, linoleic acid and abietic acid.

6. The process of claim 1, wherein said dispersing agent is an organic ester of a higher fatty acid having 12 to 20 carbon atoms.

7. The process of claim 6, wherein said organic ester is that of sorbitol and a higher fatty acid.

8. The process of claim 1, wherein said hydrocarbon is an n-paraffin.

9. The process of claim 1, wherein said hydrocarbon is kerosene, light oil, heavy oil, naphtha, or a mixture of two or more such hydrocarbons.

10. The process of claim 1, wherein said microorganism is selected from the group consisting of *Arthrobacter paraffineus* No. 2411 ATCC 15591, *Brevibacterium ketoglutamicum* No. 2473 ATCC 15588 and *Corynebacterium hydrocarboclastus* No. 2438 ATCC 15592.

References Cited

UNITED STATES PATENTS 3,498,883   3/1970   Iguchi et al. _____ 195—28 R

LIONEL M. SHAPIRO, Primary Examiner

195—114